United States Patent
Wahrlich et al.

(10) Patent No.: US 11,513,252 B2
(45) Date of Patent: Nov. 29, 2022

(54) METAL DETECTOR

(71) Applicant: Minelab Electronics Pty Limited, Mawson Lakes (AU)

(72) Inventors: Philip Shane Wahrlich, Mawson Lakes (AU); Benjamin James Whelan, Mawson Lakes (AU)

(73) Assignee: Minelab Electronics Pty. Limited, South Australia (AU)

( * ) Notice: Subject to any disclaimer, the term of this patent is extended or adjusted under 35 U.S.C. 154(b) by 528 days.

(21) Appl. No.: 16/410,091

(22) Filed: May 13, 2019

(65) Prior Publication Data
US 2019/0346585 A1 Nov. 14, 2019

(30) Foreign Application Priority Data
May 11, 2018 (AU) .............................. 2018901628

(51) Int. Cl.
| | | |
|---|---|---|
| G06F 11/30 | (2006.01) | |
| G01V 3/38 | (2006.01) | |
| G01V 3/15 | (2006.01) | |
| G01V 3/08 | (2006.01) | |
| G01V 99/00 | (2009.01) | |

(52) U.S. Cl.
CPC ............. *G01V 3/38* (2013.01); *G01V 3/08* (2013.01); *G01V 3/15* (2013.01); *G01V 99/00* (2013.01)

(58) Field of Classification Search
CPC ................................................ G01V 3/38
See application file for complete search history.

(56) References Cited

U.S. PATENT DOCUMENTS

| | | | | |
|---|---|---|---|---|
| 6,559,645 B2* | 5/2003 | Arndt | ..................... | G01V 3/104 324/233 |
| 9,207,315 B1* | 12/2015 | Plautz | .................. | G01S 13/885 |
| 9,366,779 B2* | 6/2016 | Wahrlich | ................. | G01V 3/10 |

* cited by examiner

*Primary Examiner* — Phuong Huynh
(74) *Attorney, Agent, or Firm* — The Webb Law Firm

(57) ABSTRACT

A method for improving a performance of a metal detector, including: determining positions of a sensor head of the metal detector with respect to a coordinate system as the sensor head is moved on top of a ground; processing a receive signal received by the sensor head to produce a substantially ground balanced signal that is substantially insensitive to signals due to the ground; and actively controlling the step of processing based on one or more of the determined positions as the metal detector is moved on top of the ground; wherein, during a continuous use of the metal detector, the determined positions are processed to control, without any instruction or indication from an operator of the metal detector to do so, the step of processing the receive signal to produce the substantially ground balanced signal.

18 Claims, 3 Drawing Sheets

First Time

Move Away

Second Time

METAL DETECTOR

CROSS-REFERENCE TO RELATED APPLICATION

This application claims priority to Australian Patent Application No. 2018901628 filed May 11, 2018, the disclosure of which is hereby incorporated by reference in its entirety.

TECHNICAL FIELD

The present disclosure relates to a metal detector.

BACKGROUND

The general forms of most metal detectors which interrogate soil are either handheld battery operated units, conveyor-mounted units, or vehicle-mounted units. Examples of handheld products include detectors used to locate gold; explosive land mines or ordnance; or coins and treasure. Examples of conveyor-mounted units include fine gold detectors in ore mining operations, and examples of a vehicle-mounted unit include a unit to locate buried land mines.

These metal detectors usually, but not necessarily, consist of transmit electronics generating a repeating transmit signal cycle of a fundamental period, which is applied to an inductor, for example a transmit coil, which transmits a resulting varying magnetic field, sometimes referred to as a transmit magnetic field.

These metal detectors may also contain receive electronics that process a receive signal from a measured receive magnetic field, during one or more receive periods during the repeating transmit signal cycle, to produce an indicator output signal, the indicator output signal at least indicating the presence of at least a metal target within the influence of the transmit magnetic field.

During the processing of the receive signal, the receive signal is either sampled, or demodulated, to produce one or more target channels, the one or more target channels may be further processed to produce the indicator output signal.

U.S. Pat. No. 9,207,315B1 describes the use of measured sensor head motion to affect various signal processing aspects of a metal detector, including altering filter methods, recovery speeds and self-adjusting thresholds. U.S. Pat. No. 9,207,315B1 also notes that both ground tracking and discrimination effectiveness are affected by sweep speed, but does not describe how ground tracking can be optimised if sweep speed is known. Additionally, U.S. Pat. No. 9,207,315B1 describes using motion information, and explicitly vertical loop motion or "bobbing" the loop up and down, to automatically initiate ground balancing. This type of motion is commonly performed after the operator has manually initiated ground balancing in order to aid the effectiveness of the ground balancing process, so the method described in U.S. Pat. No. 9,207,315B1 constitutes an effective application of gesture recognition to automatically initiate ground balancing.

Needs exist for metal detectors with improved soil rejection. The present disclosure describes alternative methods for utilising position measurements to improve soil rejection and target detection with a metal detector.

SUMMARY

According to a first aspect of the present disclosure, there is provided a method for improving a performance of a metal detector, including: determining positions of a sensor head of the metal detector with respect to a coordinate system as the sensor head is moved on top of a ground; processing a receive signal received by the sensor head to produce a substantially ground balanced signal that is substantially insensitive to signals due to the ground; and actively controlling the step of processing based on one or more of the determined positions as the metal detector is moved on top of the ground; wherein, during a continuous use of the metal detector, the determined positions are processed to control, without any instruction or indication from an operator of the metal detector to do so, the step of processing the receive signal to produce the substantially ground balanced signal.

In one form, the determined positions are processed to control a time to change the step of processing the receive signal to produce the substantially ground balanced signal. In one form, the step of processing a receive signal received by the sensor head to produce a substantially ground balanced signal is changed when the sensor head is maintained at a substantially same distance from the ground during the continuous use. In one form, the step of processing the receive signal includes combining proportions of at least two signals based on the receive signal to produce the substantially ground balanced signal that is substantially insensitive to signals due to the ground. In one form, the step of controlling includes: adjusting, at least based on one or more of the determined positions, one or more of the proportions of the at least two signals combined in the step of combining. In one form, the step of controlling includes: adjusting a rate of producing a new substantially ground balanced signal.

In one form, the step of determining the positions is performed by a camera of the metal detector analysing images of an environment near the sensor head. In one form, the step of determining the positions is performed by a visual-inertial odometry. In one form, the step of determining the positions is performed by an accelerometer monitoring a movement of the sensor head, by a satellite-based positioning system, or by Global Positioning System (GPS). In one form, the step of processing the receive signal to produce the substantially ground balanced signal with respect to the determined positions is determined and adjusted based on a solution to a Simultaneous Localisation and Mapping (SLAM) problem. In one form, the rate of adjusting the step of processing the receive signal to produce the substantially ground balanced signal is reduced if the determined positions of the metal detector are not changing rapidly. In one form, a rate of adjusting the proportions of the at least two signals combined in the step of combining to produce the substantially ground balanced signal is reduced if the determined positions of the metal detector are not changing rapidly. In one form, the method further includes the step of: recording information used to determine the step of processing the receive signal to produce the substantially ground balanced signal in a first position; and using the recorded information when the sensor head is at or near the first position again at a later time.

In one form, the method further includes the step of: recording the proportions of the at least two signals combined in the step of combining; and using the recorded proportions when the sensor head is at or near the first position again at a later time. In one form, the step of processing the receive signal to produce the substantially ground balanced signal is dependent on a trend of an adjustment of the proportions which represents a trend of the positions of a sensor head. In one form, the method further includes the step of: using a model of a ground signal as a function of position to determine a suitable step of processing the receive signal to produce the substantially ground balanced signal at unvisited positions.

According to a second aspect of the present disclosure, there is provided a non-transitory computer readable medium including instructions to perform the steps of the first aspect.

According to a third aspect of the present disclosure, there is provided a metal detector including: a sensor head for receiving a receive signal; a position sensor for determining positions of the sensor head of the metal detector with respect to a coordinate system as the sensor head is moved on top of a ground; a processor for processing the receive signal to produce a substantially ground balanced signal that is substantially insensitive to signals due to the ground, and for actively controlling the step of processing based on one or more of the determined positions as the metal detector is moved on top of the ground; wherein, during a continuous use of the metal detector, the processor processes the determined positions to control, without any instruction or indication from an operator of the metal detector to do so, the step of processing the receive signal to produce the substantially ground balanced signal.

BRIEF DESCRIPTION OF DRAWINGS

Embodiments of the present disclosure will be discussed with reference to the accompanying drawings wherein.

DESCRIPTION OF EMBODIMENTS

Figure 1:
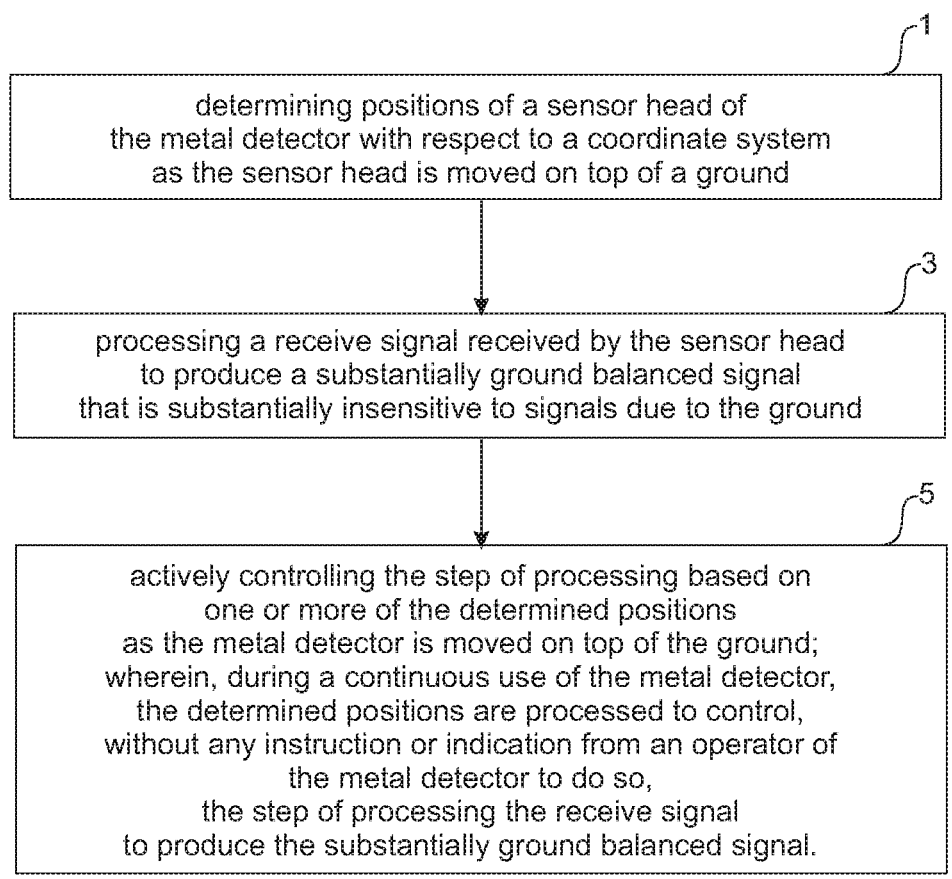
FIG. 1 depicts one embodiment of the present disclosure.

In this specification, the term "position" when used in relation to a sensor head of a metal detector broadly means the position of the sensor head with respect to a coordinate system. The term "position" when used in relation to a metal detector broadly means the overall position of the metal detector with respect to a coordinate system. For example, during operation, an operator may be standing at a particular location swinging the detector so that the sensor head moves from one side to the other. In such a case, the position of the metal detector does not change significantly while the position of the sensor head changes. In practice, when the position of a metal detector changes (i.e. an operator or a vehicle holding the metal detector moves), the position of the sensor head also changes. However, it is often the case that the position of the sensor head continues to change (moving from one side to another in search of a target) when the position of a metal detector remains relatively stationary. Further, the orientation of the sensor head or metal detector may be taken into account. For example, when considering the position of the sensor head, one may just consider the location of the sensor head using a particular coordinate system, or one may consider the orientation of the sensor head in addition to the location.

In this specification the terms "ground" and "soil" are used interchangeably. As understood by a person skilled in the art, the terms "ground" and "soil" mean surfaces of earth where targets may be contained within. The surfaces are often solid, may be homogenous or may be a combination of various soil types, and may contain moisture or water.

In this specification, the term "substantially ground balanced signal" means an output signal from which signals due to a ground are substantially absent so that those signals would not mask a signal from one or more targets. One way of producing a substantially ground balanced signal is to perform a "ground balance step" where a metal detector measures signals due to the ground with a first channel and a second channel, then, based on the signals due to the ground, subtracts a proportion of the second channel from the first channel to produce a third channel wherein the third channel is substantially insensitive to the signals due to the ground. This method can be quite successful when the measurements of the signals due to the ground are representative of the signals due to the ground over the entire spatial region of the ground to be traversed by the metal detector. However, in many situations the ground composition changes over the spatial region of the ground to be traversed by the metal detector. In these situations the third channel may be substantially insensitive to the signals due to the ground at the location where the measurements are made, but not at other locations. A method of producing a substantially ground balanced signal by performing a rotation of in-phase and quadrature-phase signals output by the metal detector is an exemplary case of subtracting the signals due to the ground from an output signal in which the coefficients of the signals being subtracted are given by the rotation angle. Another exemplary case of producing a substantially ground balanced signal is to adjust sampling windows or demodulation functions used to sample or demodulate the received signal in a way which substantially reduces the ground signal.

Another method is to, in a continuous use of a metal detector, measure the signals from the ground and perform the ground balance step at multiple times, corresponding to multiple locations over the ground as the metal detector traverses some spatial region. For example, "tracking ground balance" is a technique used to adjust the step of processing a receive signal to produce a substantially ground balanced signal slightly over time according to some model or algorithm in order to maintain the metal detector in a state whereby an output signal is substantially insensitive to the ground over a spatial region where the ground composition is variable. As mentioned before, the ground composition typically changes as the user or operator moves from one location over the ground to another. These changes occur on a wide range of spatial scales. Variability is exhibited at centimeter scale, and bulk changes in the ground conditions occur at the scale of meters. Usually a feedback loop, or some other parameter estimating model, is used to estimate the suitable step of processing a receive signal to produce a substantially ground balanced signal given some measured signals.

However, it is noted that these methods are not aware of the location of the user or operator in the environment, so they typically allow the step of processing a receive signal to produce a substantially ground balanced signal to adjust at an appropriate rate for it to track the expected changes in soil type as the operator explores an area at a slow walking pace. If the step of processing a receive signal to produce a substantially ground balanced signal is allowed to adjust at a sufficiently high rate, passing the metal detector sensor head over a metallic target can readily perturb the step of processing a receive signal to produce a substantially ground balanced signal. When this occurs there are two negative consequences. Firstly, the perturbation can lead to subsequent increased noise due to the response from soil, which can lead to a reduction in the detection depth and discrimination ability of the metal detector. Secondly, the perturbation in the step of processing a receive signal to produce a substantially ground balanced signal can reduce the response from the metallic target. For targets which produce only a weak response because of their small sizes or extreme distances from the sensor head, the reduction in the response from the metallic target can lead to the target being undetectable. If the step of processing a receive signal to produce a substantially ground balanced signal is limited to adjustment at a low rate it may not adequately track changes in soil type as the operator explores an area. This problem is exacerbated in situations where the ground composition changes significantly on small spatial scales or when the operator traverses large spatial areas of the ground over a short period of time. In these situations the step of processing a receive signal may not produce an output signal which is substantially insensitive to the signals from the ground. This can lead to subsequent increased noise due to the response from soil, which can lead to a reduction in the detection depth and discrimination ability of the metal detector.

The present disclosure offers an alternative to improve the performance of a metal detector. In a general form of one embodiment, there is provided a metal detector which actively controls the step of processing the receive signal to produce the substantially ground balanced signal based on one or more of the determined positions as the metal detector is moved on top of the ground.

In particular, with reference to FIG. 1, the metal detector first determines positions of a sensor head of the metal detector with respect to a coordinate system as the sensor head is moved on top of a ground 1.

The sensor head normally includes at least a magnetic field transmitter and a magnetic field receiver. In one form, the magnetic field transmitter and the magnetic field receiver are coils for transmitting and receiving magnetic field. In one form, the magnetic field transmitter and the magnetic field receiver are provided by a same single coil. In one form, the sensor head includes a known DD coil or a DOD coil (which consists of an O-shaped transmit coil between two mirrored D-shaped receive coils). In one form, the sensor head may include just the magnetic field receiver. In one form, the sensor head includes two separate parts, one including the transmitter, the other including the receiver.

The phrase "positions with respect to selected one or more coordinate systems" generally means positions which can be identified and located based on selected one or more coordinate systems. In this context, it is synonymous to "relative positions". A coordinate system can be of any form known to a skilled addressee, as long as it provides a reference system to track the position of the sensor. In one form, the coordinate system is one of an Earth-centered Cartesian coordinate system or an Earth-centered spherical/ellipsoidal coordinate system. In one form, it is based on a satellite-based positioning system. In one form, the coordinate system is based on Global Positioning System (GPS) coordinates. In another form, the coordinate system is a Cartesian coordinate system centered on the position where the device was initialized.

There are many methods to determine positions of the sensor head of the metal detector and positions of the metal detector with respect to a coordinate system. One method is to use measurements from a GPS receiver. Another method is to use dead reckoning based on measurements from an inertial navigation system, which may use an accelerometer. Another method is to use sensors external to the metal detector which determine the positions of the sensor head and the metal detector relative to themselves. In one form, the coordinate system is provided by an optical positioning system, for example, local positioning is possible without reference to the location of the Earth, but with reference to previous positions. Other methods may include, but are not limited to, using a camera which provides position information based on the captured images. The camera may be assisted by, or complement, another positioning means, such as a GPS. The camera may be provided by a mobile device, such as a smartphone, paired with the metal detector. The camera may be a video recorder. The camera may provide positions with respect to a coordinate system based on images of the ground captured by the camera, or based on images of environmental surroundings near the sensor head (such as vegetation on the surface of the ground, or trees nearby), or both. Another method may include using visual-inertial odometry which provides position information based on the combination of images captured with a camera and signals from one or more additional sensors such as an accelerometer, a gyroscope or a magnetometer. The visual-inertial odometry system may be assisted by, or complement, another positioning means, such as a GPS. The camera and/or additional sensors may be provided by a mobile device, such as a smartphone, paired with the metal detector.

The metal detector then processes a receive signal to produce a substantially ground balanced signal that is substantially insensitive to signals due to the ground 3 in FIG. 1. This step is also known as a ground balance. In one form, it combines proportions of at least two signals received by the sensor head to produce a substantially ground balanced signal that is substantially insensitive to signals due to the ground. There are many ways, based on various models, to achieve various combinations of portions of the two signals. The combined two signals may have been obtained at different times. In one form, the two signals may have overlapping portions in the time domain. In one form, the signals may be combined in the frequency domain. In one form, the signals are converted to digital forms prior to their combination. The term proportions mean the weightings or percentages of signals being combined. For example, in one form, the two signals, in the case where there are only two signals, are combined through a relationship of a×signal 1+b×signal 2, where at least one of a and b are adjustable coefficients. In one form, the at least two signals may be combined by modifying the means for generating a single signal, for example, by modifying the demodulation function associated with the single signal such that the single signal is sensitive to a different signal components after the modification compared to before the modification. This means of ground balance is often employed in time-domain metal detectors, whereby ground balance is achieved by adjusting the time period of at least one sampling window. It is worth noting that adjusting the time period of a uniform gain sampling window from start=t1 and stop=t2 to start=t3 and stop=t4 is conceptually equivalent to taking the signal generated by the original sampling window from start=t1 to stop=t2, subtracting the signal generated by a sampling window from start=t1 and stop=t3 and adding a signal generated by a sampling window from start=t2 and stop=t4.

The metal detector then actively controls the step of processing a receive signal to produce a substantially ground balanced signal based on one or more of the determined positions as the metal detector is moved on top of the ground (first part of step 5 of FIG. 1). The term actively means the metal detector will continue to evaluate the need to adjust the step of processing the receive signal to produce the substantially ground balanced signal based on the determined positions. It is possible for the metal detector to pair and store a position and the respective way to process the receive signal to produce the substantially ground balanced signal at that position.

During a continuous use of the metal detector, a processor processes the determined positions to determine, without any instruction or indication from an operator of the metal detector to do so, the step of processing the receive signal to produce the substantially ground balanced signal (second part of step 5 of FIG. 1). In one form, it determines a time to change the step of processing the receive signal to produce the substantially ground balanced signal. Continuous use means the metal detector is in a process of being used to search for a target. Normally, the sensor head of the metal detector would be positioned close to the surface of ground and is continually swung from left to right and back to left relative to the direction of the operator holding the metal detector (in the case where the metal detector is a handheld metal detector). It is also possible for the sensor head of the metal detector to be left substantially stationary momentarily during a continuous use. It is during the continuous use of the metal detector that the metal detector processes the determined positions to determine the suitable change to the step of processing the receive signal that is required to produce the substantially ground balanced signal. This process may occur irrespective of whether or not the sensor head is maintained at a substantially same distance from the ground during continuous use. Note that by not requiring any interruption from an operator of the metal detector to the detection process to determine the change to the step of processing the receive signal to produce the substantially ground balanced signal, the operator can focus on the detection process and be confident that the ground balancing process is being monitored, updated or adjusted automatically, based on the determined positions, to better reflect the ground conditions of new locations of grounds as the operator traverses a search area.

The adjustments made to the step of processing the receive signal to produce the substantially ground balanced signal include, but are not limited to: (a) adjusting, at least based on one or more of the determined positions, one or more of the proportions of the at least two signals combined in the step of combining; (b) adjusting a rate at which the step of producing a substantially ground balanced signal is changed.

The step of processing the receive signal that is required to produce the substantially ground balanced signal is associated with the soil under the search head. If the operator was to return to the same location, the step of processing the receive signal to produce the substantially ground balanced signal that is required would be expected to be the same as was previously established. If the user or operator travels in a straight line, and the step of processing the receive signal to produce the substantially ground balanced signal is changing in a particular way, it might be expected that continuing to travel in that straight line would result in the step of processing the receive signal to produce the substantially ground balanced signal continuing to change in that way. If the operator stays in some small area (say, a 2 square meter area), it is expected that the step of processing the receive signal to produce the substantially ground balanced signal will not change significantly.

Having a positioning system means that new concepts can be incorporated into new ground balance algorithms to improve on the state of the art. For instance:

The rate of change of the step of processing the receive signal to produce the substantially ground balanced signal can be slowed down if the position of the metal detector is not changing rapidly. The advantage of this is that when the operator is interrogating a target, swinging over the same local area of soil multiple times, the rate of change of the step of processing the receive signal to produce the substantially ground balanced signal can be slowed or stopped based on position information. This prevents the ground balance from being perturbed by repeated passes over a potential metallic target, which could otherwise cause the target signal to be reduced.

A trend-following bias can be incorporated into the step of processing the receive signal to produce the substantially ground balanced signal in order to better track predictable changes in the ground balance as the operator traverses a gradient of soil type. The advantage of this is that the ground balance can more precisely track required changes in the step of processing the receive signal to produce the substantially ground balanced signal, without having to allow the step of processing the receive signal to produce the substantially ground balanced signal to be more agile at all times.

The step of processing the receive signal to produce the substantially ground balanced signal as a function of position can be stored and recalled as the operator retraces soil which has previously been covered. The advantage of this is that as the operator retraces the soil which has been previously covered, if the current step of processing the receive signal to produce the substantially ground balanced signal is not appropriate for the soil, the correct value can be quickly recovered. This can also aid with determining whether other aspects of the metal detector are properly calibrated. For instance, if the step of processing the receive signal to produce the substantially ground balanced signal required for a particular location is different than was previously determined for that location, this may indicate that the detector is no longer calibrated as it was previously, and the detector may be recalibrated assuming that the step of processing the receive signal to produce the substantially ground balanced signal should be the same as previous. Examples of calibration errors which could be corrected in this manner include phase shifts and relative amplitude changes in the received signals.

A model of the step of processing the receive signal to produce the substantially ground balanced signal as a function of position could be created to help predict (for example, by interpolation or extrapolation) what the step of processing the receive signal to produce the substantially ground balanced signal might be at a nearby location. This is a generalisation of the examples illustrated earlier. The benefit of this is that the rate of change of the step of processing the receive signal to produce the substantially ground balanced signal can be faster when ground is being traversed rapidly, and slower or halted when ground is being traversed slowly or not at all. This means that the adjustment to the step of processing the receive signal to produce the substantially ground balanced signal can be rapid when required, while slowed when not required, reducing the chance that metallic targets are able to perturb the step of processing the receive signal to produce the substantially ground balanced signal, the result of which is to maintain substantially ground balanced signal as the ground is traversed.

More generally, the problem can be cast as one of Simultaneous Localisation and Mapping (SLAM), where one tries to jointly estimate both a map of the environment, and the current position of the metal detector sensor head in that map. In addition, since the step of processing the receive signal to produce the substantially ground balanced signal required is associated with the soil, one can use the previously estimated steps of processing the receive signals to produce the substantially ground balanced signals as a function of position to predict the step of processing the receive signal to produce the substantially ground balanced signal required at the current position of the metal detector sensor head. The step of processing the receive signal to produce the substantially ground balanced signal required at the current position may also contain information about the current position of the metal detector sensor head. For instance, if the step of processing the receive signal to produce the substantially ground balanced signal required at a first time is different to the step of processing the receive signal to produce the substantially ground balanced signal required at a second time, this may be used as evidence that at the first time the search head was in a different location compared to the second time. The required step of processing the receive signal to produce the substantially ground balanced signal may augment the primary position sensor, or in certain applications, even act, albeit weakly, as the primary position sensor.

Figure 2:
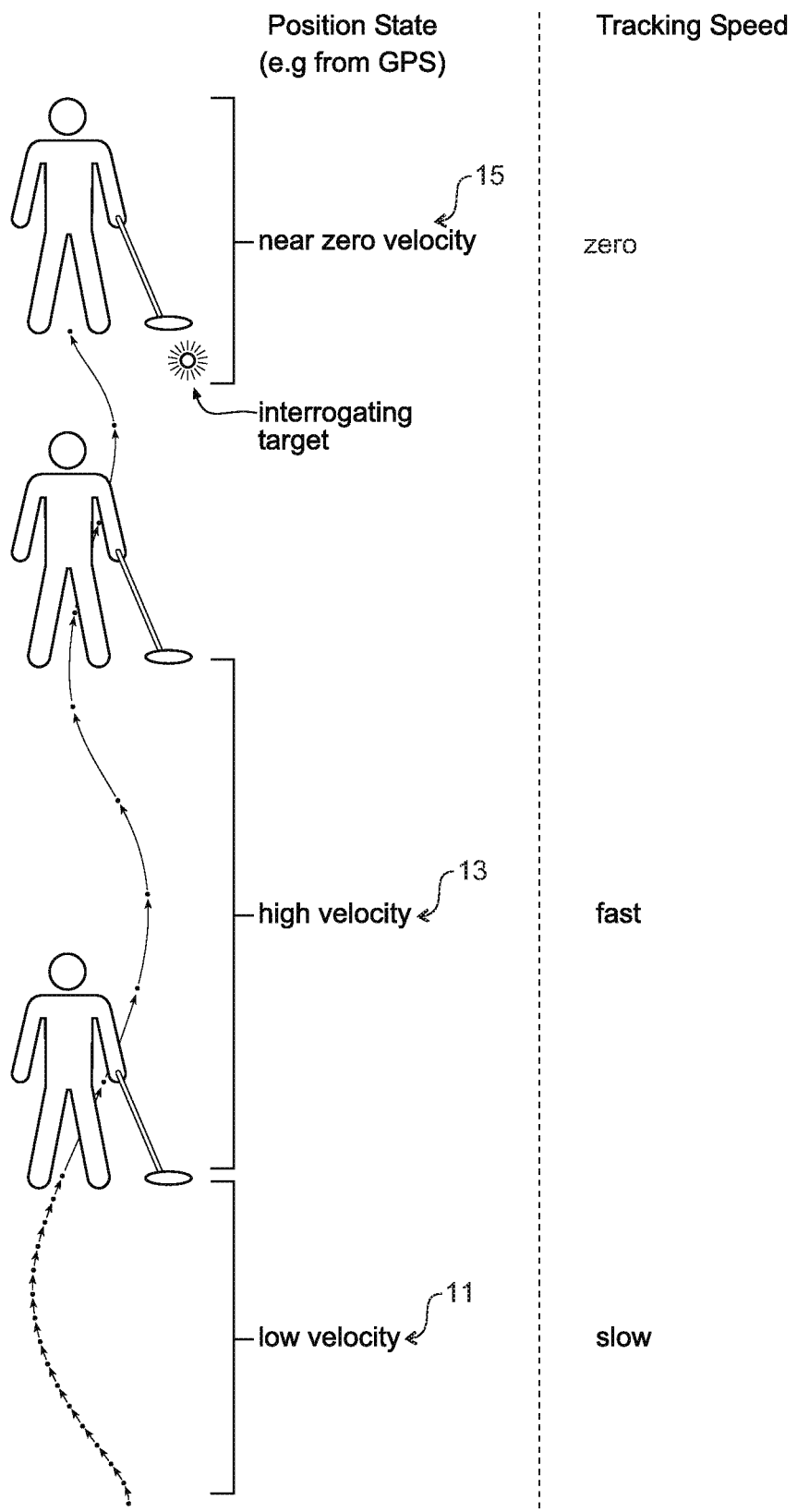
FIG. 2 depicts an exemplary situation where the determined positions assist in adjusting the rate of changing the ground balance.

FIG. 2 depicts an exemplary situation where the determined positions assist in adjusting the rate of changing the step of processing the receive signal to produce the substantially ground balanced signal. In this example, the determined positions are used to determine velocity of travelling of the user or operator of a metal detector. When the user is travelling at a low velocity 11, the tracking ground balance speed (rate of change in the step of processing the receive signal to produce the substantially ground balanced signal) will be set to slow. The idea behind this is that the ground condition has a high likelihood to change only slightly as only a short distance is being traversed. In contrast, when the user is travelling at a high velocity 13, the tracking ground balance speed will be set to high. This allows the step of processing the receive signal to produce the substantially ground balanced signal to more effectively follow the changes in the ground. When the user is stationary or near zero velocity 15, the tracking ground balance speed is set to zero. This is because, most probably, the user has picked up a target signal and would like to interrogate further around a small patch of ground to identify the best location to dig for the target. If the step of processing the receive signal to produce the substantially ground balanced signal is changed based on time, the step of processing the receive signal to produce the substantially ground balanced signal would change as the user spends more time in the same patch of ground, thus degrading the ability of the metal detector to detect the intended target.

In one form, combining measurements obtained at previous times with measurements obtained at the current time allows for a more precise estimate of the step of processing the receive signal to produce the substantially ground balanced signal that best removes the unwanted ground signal from the output signal. The measurements may comprise the relative or absolute position at which each measurement was made and information used to determine the step of processing the receive signal to produce the substantially ground balanced signal at that position which can include, but is not limited to, the metal detector receive signals or the parameters that define the step of processing the receive signal to produce the substantially ground balanced signal. The internal representation of parameters used to determine the step of processing the receive signal to produce the substantially ground balanced signal at different positions can take many forms, depending upon the form of metal detector technology being employed. Examples include, but are not limited to: the complex phase angles at the one or more demodulation frequencies of the detector; the time boundaries and associated coefficients of one or more sampling windows that, when summed with weights given by those coefficients, substantially remove the ground signal from the output signal; the amplitudes of two or more independent components of ground signal, as disclosed in U.S. Pat. No. 9,366,799B1, which approximate the ground signal measured at each observed point above the ground.

The combination of measurements made at times previous to the current time with the measurement made at the current time allows for sources of stochastic error in the measured signals including, but not limited to, electromagnetic interference and electronics noise, to be mitigated. The measurements made at previous times may have been obtained recently, such as during a previous sweep of the sensor head or previous traversal of the same vicinity of soil, or may have been obtained at an even earlier time, such as during a previous metal detecting session. The measurements may have been obtained with the current detector, or may have been obtained from a different source including, but not limited to, a different metal detector configuration, a different metal detector model, or a different source such as a geological survey. Through the use of an algorithm that converts the previous measurements to a form suitable for use with the current detector, the previous measurements are able to be combined with current measurements. In this way, measurements made at a previous time may be combined with the measurement made at the current time in such a way as to bias the step of adjusting the step of processing the receive signal to produce the substantially ground balanced signal toward that suggested by the old measurements, or predictions based thereon.

The store of previous and current measurements can take many forms. One form may be considered a map of the measurements as a function of relative or absolute position, made from measurements at times previous to the current time, wherein that map may be updated as new measurements are made. In another form, the store may be considered a database of measurements.

The method of combining previous measurements with current measurements can take a variety of forms. The measurements chosen for this combination may depend upon the relative positions of those measurements, the difference between the times at which those measurements were obtained, or any combination thereof. Examples include, but are not limited to, using previous measurements that are within a given distance of the current sensor head position, producing a combination in which the contribution of an input is weighted according to a function of its position relative to the current sensor head position; using previous measurements that were obtained within a given time period of the current measurement; or producing a combination in which the contribution of a measurement is weighted according to the time difference between obtaining it and the current measurement. One example of such a weighting scheme is to consider all previous measurements within 10 meters of the current position and weight the contribution of those measurements to the determination of the step of processing the receive signal to produce the substantially ground balanced signal at the current position in proportion to the inverse of their distance from the current measurement point.

The method of combining previous and current measurements to produce the step of processing the receive signal to produce the substantially ground balanced signal at the current position of the sensor head depends upon the method of ground balance being employed. In one embodiment, a weighted average of previous and current one or more parameters determining the step of processing the receive signal to produce the substantially ground balanced signal, such as the complex phase angle of the ground signal, may be produced. In another embodiment, a likelihood function may be employed to determine the most likely parameters determining the step of processing the receive signal to produce the substantially ground balanced signal given current and previous measurements. In another embodiment, the free parameters of a predetermined model of ground signal may be found. The free parameters are chosen to minimise a measure of the residuals, such as the sum of squared residuals, between predictions from the model and measurements made at each observation position.

The step of updating the store of measurements may be executed at a rate matching the sampling rate of the detector, or may be executed at intervals whereby subsets of the overall map or database are updated in batches. The intervals of such batch updates may be fixed or varied; in case of the latter, the intervals can be chosen according to criteria such as, but not limited to, the distance or area traversed by the sensor head since the last batch update, the observed variation in the metal detector receive signals due to the ground as a function of position or time, or a processing schedule allocated by control electronics within the metal detector that prevents the computational capacity of the processing electronics from being exceeded.

Figure 3:
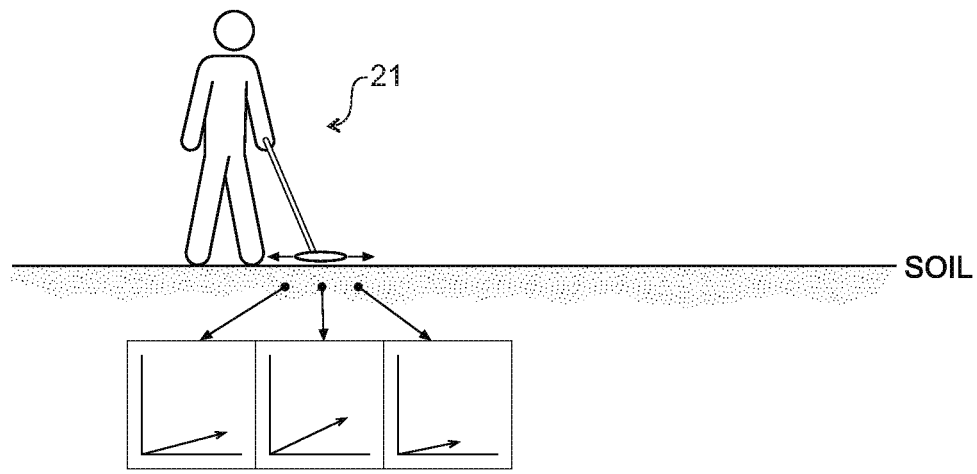
FIG. 3 depicts a method of using repeated measurements in a same general vicinity of ground as a way to increase the accuracy of a ground model used by a metal detector.
Figure 3:
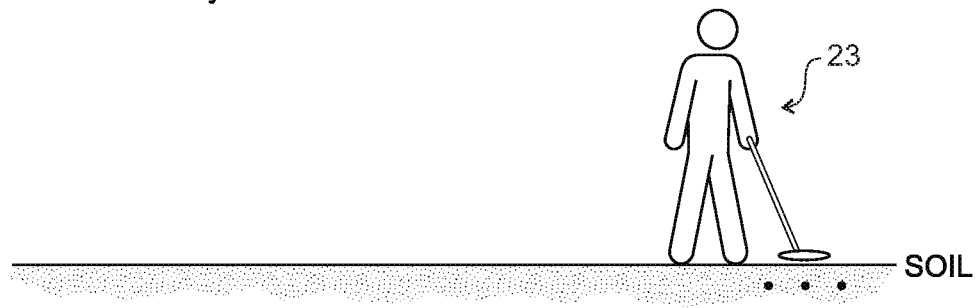
Figure 3:
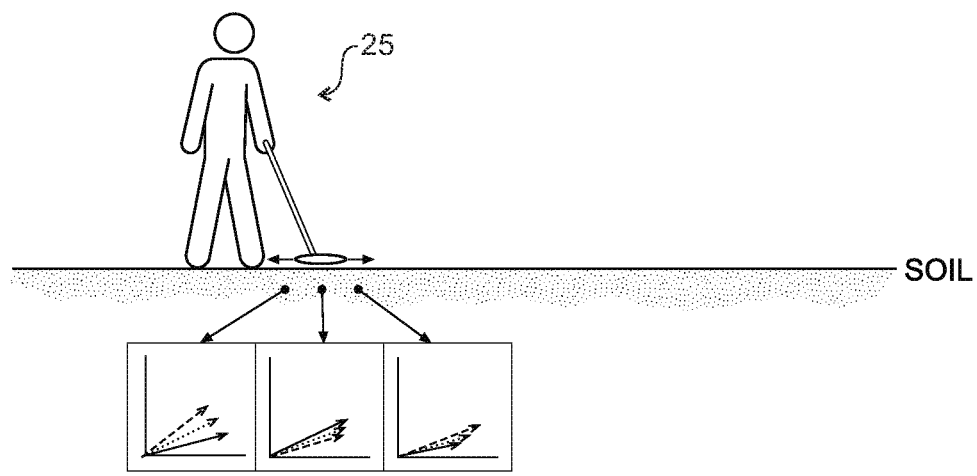

FIG. 3 depicts a method of using repeated measurements in a same general vicinity of ground as a way to increase the effectiveness of the step of processing the receive signal to produce the substantially ground balanced signal as employed by a metal detector.

Each row of FIG. 3 shows a snapshot in time. In the top row, the operator of a metal detector has swung the detector and obtained receive signals from three different positions 21. Three graphs below the operator represent the complex vector (plotting Q vs P) representing signals obtained by the detector at the three different positions. In the second row of FIG. 3, the operator has walked away and measured some other parts of the soil (measurements not shown) 23. In the third row of FIG. 3, the operator has moved back to the original positions 25 shown in the first row of FIG. 3 and swung over the same three positions as the operator did originally. The metal detector now has one more receive signal measurement (with dashed lines) for each of the three positions. Thus, the metal detector can combine those receive signal measurements via an average to improve the estimate of the ground signal at each of those points (with dotted lines). Those average values can subsequently be used to apply a rotation to the receive signals to produce a substantially ground balanced signal that is substantially insensitive to signals due to the ground, where the required rotation depends upon the position of the sensor head.

Those of skill in the art would understand that information and signals may be represented using any of a variety of technologies and techniques. For example, data, instructions, commands, information, signals, bits, symbols, and chips referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

The invention claimed is:

1. A method for improving a performance of a metal detector, including:
   determining positions of a sensor head of the metal detector with respect to a coordinate system as the sensor head is moved on top of a ground;

processing a receive signal received by the sensor head to produce a substantially ground balanced signal that is substantially insensitive to signals due to the ground; and actively controlling the step of processing based on one or more of the determined positions as the metal detector is moved on top of the ground; wherein, during a continuous use of the metal detector, the determined positions are processed to control, without any instruction or indication from an operator of the metal detector to do so, the step of processing the receive signal to produce the substantially ground balanced signal.

2. The method of claim 1, wherein the determined positions are processed to control a time to change the step of processing the receive signal to produce the substantially ground balanced signal.

3. The method of claim 1, wherein the step of processing a receive signal received by the sensor head to produce a substantially ground balanced signal is changed when the sensor head is maintained at a substantially same distance from the ground during the continuous use.

4. The method of claim 1, wherein the step of processing the receive signal includes combining proportions of at least two signals based on the receive signal to produce the substantially ground balanced signal that is substantially insensitive to signals due to the ground.

5. The method of claim 4, wherein the step of controlling includes:
adjusting, at least based on one or more of the determined positions, one or more of the proportions of the at least two signals combined in the step of combining.

6. The method of claim 1, wherein the step of controlling includes:
adjusting a rate of producing a new substantially ground balanced signal.

7. The method of claim 1, wherein the step of determining the positions is performed by a camera of the metal detector analysing images of an environment near the sensor head.

8. The method of claim 1, wherein the step of determining the positions is performed by a visual-inertial odometry.

9. The method of claim 1, wherein the step of determining the positions is performed by an accelerometer monitoring a movement of the sensor head, by a satellite-based positioning system, or by Global Positioning System (GPS).

10. The method of claim 1, wherein the step of processing the receive signal to produce the substantially ground balanced signal with respect to the determined positions is determined and adjusted based on a solution to a Simultaneous Localisation and Mapping (SLAM) problem.

11. The method of claim 6, wherein the rate of adjusting the step of processing the receive signal to produce the substantially ground balanced signal is reduced if the determined positions of the metal detector are not changing rapidly.

12. The method of claim 5, wherein a rate of adjusting the proportions of the at least two signals combined in the step of combining to produce the substantially ground balanced signal is reduced if the determined positions of the metal detector are not changing rapidly.

13. The method of claim 1, further including the step of:
recording information used to determine the step of processing the receive signal to produce the substantially ground balanced signal in a first position; and
using the recorded information when the sensor head is at or near the first position again at a later time.

14. The method of claim 5, further including the step of:
recording the proportions of the at least two signals combined in the step of combining; and
using the recorded proportions when the sensor head is at or near the first position again at a later time.

15. The method of claim 1, wherein the step of processing the receive signal to produce the substantially ground balanced signal is dependent on a trend of an adjustment of the proportions which represents a trend of the positions of a sensor head.

16. The method of claim 1, further including:
using a model of a ground signal as a function of position to determine a suitable step of processing the receive signal to produce the substantially ground balanced signal at unvisited positions.

17. A non-transitory computer readable medium including instructions to perform the steps of claim 1.

18. A metal detector including:
a sensor head for receiving a receive signal;
a position sensor for determining positions of the sensor head of the metal detector with respect to a coordinate system as the sensor head is moved on top of a ground;
a processor for processing the receive signal to produce a substantially ground balanced signal that is substantially insensitive to signals due to the ground, and for actively controlling the step of processing based on one or more of the determined positions as the metal detector is moved on top of the ground;
wherein, during a continuous use of the metal detector, the processor processes the determined positions to control, without any instruction or indication from an operator of the metal detector to do so, the step of processing the receive signal to produce the substantially ground balanced signal.

* * * * *